United States Patent
Hara et al.

(10) Patent No.: US 12,202,549 B2
(45) Date of Patent: Jan. 21, 2025

(54) VEHICLE FRONT PART STRUCTURE

(71) Applicant: TOYOTA JIDOSHA KABUSHIKI KAISHA, Toyota (JP)

(72) Inventors: Yasuhiro Hara, Nagoya (JP); Norimasa Koreishi, Miyoshi (JP); Jumpei Watanabe, Nagakute (JP); Hirotaka Ishioka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 352 days.

(21) Appl. No.: 17/719,927

(22) Filed: Apr. 13, 2022

(65) Prior Publication Data

US 2022/0402556 A1 Dec. 22, 2022

(30) Foreign Application Priority Data

Jun. 22, 2021 (JP) ................. 2021-103557

(51) Int. Cl.
*B62D 25/08* (2006.01)
*B60N 2/005* (2006.01)
*B62D 25/14* (2006.01)

(52) U.S. Cl.
CPC ........... *B62D 25/085* (2013.01); *B60N 2/005* (2013.01); *B62D 25/14* (2013.01)

(58) Field of Classification Search
CPC ...... B62D 25/085; B62D 25/08; B62D 25/14; B62D 25/142; B62D 33/06; B60K 37/00; B60K 37/10; B60K 37/20; B60N 2/005

(Continued)

(56) References Cited

U.S. PATENT DOCUMENTS 6,220,380 B1 * 4/2001 Mita ................ B60K 1/04
180/65.1
6,698,813 B2 * 3/2004 Nonaka ............ B60N 2/0742
296/65.01

(Continued)

FOREIGN PATENT DOCUMENTS

CN 111661170 A 9/2020
DE 4005605 A1 * 8/1991

(Continued)

OTHER PUBLICATIONS

Kasai (DE 102004038857 A1), machine translation (Year: 2005).*

(Continued)

*Primary Examiner* — Amy R Weisberg
*Assistant Examiner* — Wenwei Zhuo
(74) *Attorney, Agent, or Firm* — Dinsmore & Shohl LLP (57) ABSTRACT

Instrument panel side parts are provided integrally with an instrument panel main body part. Vehicle-mounted components are housed in the instrument panel side parts. Thus, even in a vehicle in which an engine compartment is not provided on a vehicle front side in a vehicle cabin it is possible to ensure a housing space for these vehicle mounting parts. Further, the instrument panel side parts are provided integrally with the instrument panel main body part. Thus, compared to a case in which the instrument panel side parts are separated from the instrument panel main body part, a space around the driver's seat can be expanded by the reduced amount of dead space, and the comfortability of the driver can be ensured.

9 Claims, 3 Drawing Sheets

(58) Field of Classification Search
USPC .......... 296/193.09, 70, 74, 190.01; 180/68.4, 180/68.6
See application file for complete search history.

(56) References Cited

U.S. PATENT DOCUMENTS

| | | | | |
|---|---|---|---|---|
| 2006/0103127 | A1* | 5/2006 | Lie | B62D 21/02 |
| | | | | 280/781 |
| 2019/0111785 | A1* | 4/2019 | Ory | B60K 35/10 |
| 2020/0223485 | A1 | 7/2020 | Wang | |
| 2020/0254906 | A1* | 8/2020 | Luchner | B60N 2/074 |
| 2020/0262500 | A1* | 8/2020 | Hara | B60P 1/431 |
| 2021/0197670 | A1* | 7/2021 | Sakurai | B60K 35/656 |

FOREIGN PATENT DOCUMENTS

| | | | | | |
|---|---|---|---|---|---|
| DE | 102004038857 | A1 | * | 4/2005 | ............. B60K 37/00 |
| DE | 102020200409 | A1 | * | 7/2021 | |
| FR | 2936485 | A1 | * | 4/2010 | ............... B60N 2/01 |
| JP | 02-091011 | U | | 7/1990 | |
| JP | H03-088836 | U | | 9/1991 | |
| JP | H10-315857 | A | | 12/1998 | |
| JP | 2008100608 | A | * | 5/2008 | |
| JP | 2015-133803 | A | | 7/2015 | |
| JP | 2020-131981 | A | | 8/2020 | |
| KR | 100776657 | B1 | * | 11/2007 | |
| WO | WO-2010097890 | A1 | * | 9/2010 | ......... B60H 1/00535 |

OTHER PUBLICATIONS

Hinderhofer et al. (DE 4005605 A1), machine translation (Year: 1991).*
Kim (KR 100776657 B1), machine translation (Year: 2007).*
Guillez (FR 2936485 A1), machine translation (Year: 2010).*
Inoue et al. (JP 2008100608 A), machine translation (Year: 2008).*

* cited by examiner

VEHICLE FRONT PART STRUCTURE

CROSS-REFERENCE TO RELATED APPLICATION

This application claims priority to Japanese Patent Application No. 2021-103557 filed on Jun. 22, 2021, incorporated herein by reference in its entirety.

BACKGROUND

1. Technical Field

The present disclosure relates to a vehicle front part structure.

2. Description of Related Art

The following Japanese Unexamined Patent Application Publication No. 2015-133803 (JP 2015-133803 A) discloses a technique in which a power unit is disposed at a front part of a vehicle and a driver's seat is disposed on a vehicle upper side of the power unit and at a center part in a vehicle width direction. In this prior art, room side panels are each provided on the vehicle upper side of suspension towers, and subunit rooms are each defined and formed inside a vehicle cabin by the room side panels.

In the case of a vehicle having an engine compartment on the vehicle front side inside the vehicle cabin, vehicle-mounted components such as accessories of the power unit and various components such as a vehicle air conditioning device are arranged in the engine compartment. In contrast, in the case of a vehicle in which the engine compartment is not provided on the vehicle front side inside the vehicle cabin, it is necessary to separately ensure a housing space for the vehicle-mounted components.

In the above prior art, the subunit chambers are provided on the right and left sides of the driver's seat, and by arranging the vehicle-mounted components in the subunit chambers, it is possible to ensure a housing space for the vehicle-mounted components.

SUMMARY

However, in the above prior art, since the instrument panel and the right and left subunit chambers are provided around the driver's seat, in the viewpoint of ensuring the housing space for the vehicle-mounted components while securing the driver's comfort, the degree of freedom of mounting the vehicle-mounted components may be limited.

In consideration of the above facts, the present disclosure can acquire a vehicle front part structure that can ensure a housing space for vehicle-mounted components while securing the comfort of a driver even if a vehicle does not have an engine compartment on a front side of the vehicle inside the vehicle cabin.

The vehicle front part structure according to a first aspect of the present disclosure, includes: a power unit mounted on the vehicle front part; a driver's seat disposed on a vehicle upper side and on a center side in a vehicle width direction with respect to the power unit; and an instrument panel configured to include an instrument panel main body part that is disposed on a vehicle front side with respect to the driver's seat, and right and left instrument panel side parts that are provided integrally with the instrument panel main body part, that are disposed on both sides of the driver's seat in the vehicle width direction, and that house vehicle-mounted components inside.

In the vehicle front part structure according to the first aspect, the power unit is mounted on a vehicle front part and the driver's seat is disposed on the vehicle upper side with respect to the power unit and on the center side in the vehicle width direction. The instrument panel includes the instrument panel main body provided in vehicle front side of the driver's seat, and the right and left instrument panel side parts provided on the right and left sides of the instrument panel main body part. The instrument panel side parts are provided integrally with the instrument panel main body part and are disposed on both sides in the vehicle width direction with respect to the driver's seat, and the vehicle-mounted components are housed in the instrument panel side part.

As described above, in the first aspect, the right and left instrument panel side parts are provided integrally with the instrument panel main body part and thus, the instrument panels are provided in the vehicle cabin from the vehicle front side with respect to the driver's seat to both sides in the vehicle width direction.

As described above, when the engine compartment is not provided on the vehicle front side of the inside of the vehicle cabin, the disposing location of the vehicle-mounted components is restricted, compared to a vehicle in which the engine compartment is provided on the vehicle front side of the inside of the vehicle cabin. In the present disclosure, by housing the vehicle-mounted components in the instrument panel side part, it is possible to ensure a storage space for the vehicle-mounted components.

Further, in the first aspect, since the instrument panel side parts are provided integrally with the instrument panel main body part, dead space is reduced as compared with a case in which the instrument panel side parts are provided so as to be separated from the instrument panel main body part. Thus, in the present disclosure, the space around the driver's seat can be expanded by the reduced amount of dead space, and the comfortability of the driver can be ensured.

Further, since the instrument panel side parts are provided integrally with the instrument panel main body part, it is possible to continuously form the outer shape line of the instrument panel side parts and the instrument panel main body part. Thus, as compared with a case in which the instrument panel side parts are provided so as to be separated from the instrument panel main body part, it is possible to improve the design around the driver's seat.

Here, the term "the instrument panel side parts are provided integrally with the instrument panel main body portion" does not necessarily mean that the instrument panel side parts and the instrument panel main body part are formed so as to be connected to each other by integral forming, or the like, as long as the instrument panel side parts and the instrument panel main body part are formed so as to be connected.

In the vehicle front part structure according to a second aspect of the present disclosure, in the vehicle front part structure according to the first aspect, a vehicle air conditioning device among the vehicle-mounted components may be housed in one of the instrument panel side parts.

In the vehicle front part structure according to the second aspect, among the right and left instrument panel side parts disposed on both sides in the vehicle width direction with respect to the driver's seat, the vehicle air conditioning device is housed in one of the instrument panel side parts.

The vehicle front part structure according to a third aspect of the present disclosure, in the vehicle front part structure according to the first or second aspect, a reserve tank that stores coolant of a radiator, among the vehicle-mounted components, may be housed in another one of the instrument panel side parts.

In the vehicle front part structure according to the third aspect, among the right and left instrument panel side part disposed on both sides in the vehicle width direction with respect to the driver's seat, the reserve tank may be housed in the other instrument panel side part.

In the vehicle front part structure according to a fourth aspect of the present disclosure, in the vehicle front part structure according to the third aspect, in the other one of the instrument panel side parts, a relay box that houses an electronic component, among the vehicle-mounted components, may be arranged with the reserve tank in the vehicle front-rear direction.

In the vehicle front part structure according to the fourth aspect, among the right and left instrument panel side parts disposed on both sides in the vehicle width direction with respect to the driver's seat, the relay box is housed in the other instrument panel side part and the relay box is arranged with the reserve tank along the vehicle front-rear direction.

Thus, it possible to shorten the dimensions of the instrument panel side part in the vehicle width direction, as compared to a case in which the relay box is arranged with the reserve tank along the vehicle width direction. As a result, it is possible to reduce the stressed feeling that is felt by the driver and that is caused by the instrument panel side part. Further, by arranging the relay box with the reserve tank along the vehicle front-rear direction, for example, the relay box can be inspected at the same time when the coolant of the reserve tank is supplied, and the workability is good.

The vehicle front part structure according to a fifth aspect of the present disclosure, in the vehicle front part structure according to any one of the first to fourth aspect, at least one of the instrument panel side parts and the front part of the driver's seat may be arranged so as to overlap when viewed in the vehicle width direction.

In the vehicle front part structure according to the fifth aspect, among the right and left instrument panel side parts disposed on both sides in the vehicle width direction with respect to the driver's seat, at least one of the instrument panel side parts and the front part of the driver's seat are arranged to overlap when viewed in the vehicle width direction.

For example, when the instrument panel side part is arranged so as to completely overlap with the driver's seat when viewed in the vehicle width direction, the instrument panel side part will be provided next to the driver's seat over the entire vehicle front-rear direction of the driver's seat, and the space around the driver's seat feels narrow.

On the other hand, in the present disclosure, the instrument panel side part and the front part of the driver's seat are arranged so as to overlap in the vehicle width direction. In other words, a rear part side of the driver's seat does not overlap with the instrument panel side part when viewed in the vehicle width direction. On the rear part side of the driver's seat, a space is formed between the driver's seat and the vehicle side part, and the space around the driver's seat is expanded by that amount.

The vehicle front part structure according to a sixth aspect of the present disclosure, in the vehicle front part structure according to any one of the first to fifth aspects, the instrument panel side part may be configured to include an inner wall part that configures an inner side in the vehicle width direction and a rear wall part that configures a rear side in the vehicle front-rear direction, and the inner wall part may be formed in an arc shape so as to extend outward in the vehicle width direction as the inner wall part extends from the instrument panel main body part toward the rear wall part in a plan view.

In the vehicle front part structure according to the sixth aspect, the instrument panel side part is configured to include an inner wall part that configures an inner side in the vehicle width direction and a rear wall part that configures a rear side in the vehicle front-rear direction. Then, the inner wall part of the instrument panel side part has an arc shape so as to extend toward the outer side in the vehicle width direction as it extends from the instrument panel main body part side of the instrument panel side part to the rear wall part of the instrument panel side wall part. Thus, in the present disclosure, the instrument panel main body part side of the instrument panel side part (the front end of the instrument panel side part) has a larger dimension in the vehicle width direction than the rear wall part of the instrument panel side part.

As a comparative example, when the inner wall part of the instrument panel side part is formed in a linear shape along the vehicle front-rear direction from the instrument panel main body part side (the front end of the instrument panel side part) toward the rear wall part of the instrument panel side part, the dimensions of the front end and the rear wall part of the instrument panel side part in the vehicle width direction are the same.

Thus, when the dimensions of the rear wall part of the instrument panel side part in the vehicle width direction are the same in the comparative example and the present embodiment, since the dimension of the front end of the instrument panel side part in the vehicle width direction is larger in the present disclosure, the housing space in the instrument panel side part can be increased compared to the comparative example.

Further, when the dimensions of the front end of the instrument panel side part in the vehicle width direction are the same in the comparative example and the present disclosure, the dimension of the rear wall part of the instrument panel side part in the vehicle width direction is shorter in the present disclosure. As a result, the separation distance between the instrument panel side part and the driver's seat can be increased.

The vehicle front part structure according to a seventh aspect of the present disclosure, in the vehicle front part structure according to any one of the first to sixth aspects, a driver's seat floor part on which the driver's seat is arranged may be disposed at a position higher than another floor part inside a vehicle cabin, and a step may be provided between the driver's seat floor part and the other floor part.

In the vehicle front part structure according to the seventh aspect, the driver's seat floor part in which the driver's seat is arranged is disposed at a position higher than other floor part in the vehicle cabin, and a step is provided between the driver's seat floor part and other part. Thus, it is possible to set the other floor part lower than the driver's seat floor part, and the occupant can more easily get on and off in the other floor part.

The vehicle front part structure according to an eighth aspect of the present disclosure, in the vehicle front part structure according to any one of the first to seventh aspects, between one of the instrument panel side parts and the driver's seat, a passage part that connects the driver's seat floor part and the other floor part inside the vehicle cabin may be provided.

In the vehicle front part structure according to the eight aspect, among the right and left instrument panel side parts disposed on both sides in the vehicle width direction with respect to the driver's seat, between one of the instrument panel side parts and the driver's seat, the passage part that connects the driver's seat floor part and the other floor part in the vehicle cabin is formed and thus, the occupant can come and go between the driver's seat floor part and the other floor part.

As described above, with the vehicle front part structure according to the first aspect, it is possible to ensure a housing space for the vehicle-mounted components while securing the comfort of a driver even if a vehicle does not have an engine compartment on a front side of the vehicle inside the vehicle cabin.

With the vehicle front part structure according to the second aspect, it is possible to secure the housing space for the vehicle air conditioning device in one of the instrument panel side parts.

With the vehicle front part structure according to the third aspect, it is possible to secure the housing space for the reserve tank in the other instrument panel side part.

With the vehicle front part structure according to the fourth aspect, it is possible to secure the housing space for the relay box in the other instrument panel side part.

With the vehicle front part structure according to the fifth aspect, it is possible to reduce the stressed feeling that is felt by the driver and that is caused by the instrument panel side part being provided on the side in the vehicle width direction.

With the vehicle front part structure according to the sixth aspect, the space around the driver's seat can be widened toward the rear part side of the instrument panel side part, and an open feeling can be obtained for the occupant by that amount.

With the vehicle front part structure according to the seventh aspect, it is possible to make it easier for occupants to get on and off, on the floor part other than the driver's seat floor part.

With the vehicle front part structure according to the eight aspect, the occupant can move between the driver's seat floor part and the other floor part.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Hereinafter, a vehicle front part structure 10 according to one embodiment of the present disclosure will be described with reference to the drawings. In each drawing, some reference signs may be omitted in order to make the drawings easier to see. Further, an arrow FR, an arrow LH, and an arrow UP that are appropriately described in each drawing indicate forward of the vehicle (advancing direction), leftward of the vehicle, and upward of the vehicle, respectively. Hereinafter, when the description is made simply using terms indicating directions i.e., forward and rearward, right and left, and upward and downward, these means forward and rearward in the vehicle front-rear direction, right and left in the vehicle right-left direction (vehicle width direction), and upward and downward in the vehicle up-down direction unless otherwise specified.

Vehicle Body Configuration

Figure 1:
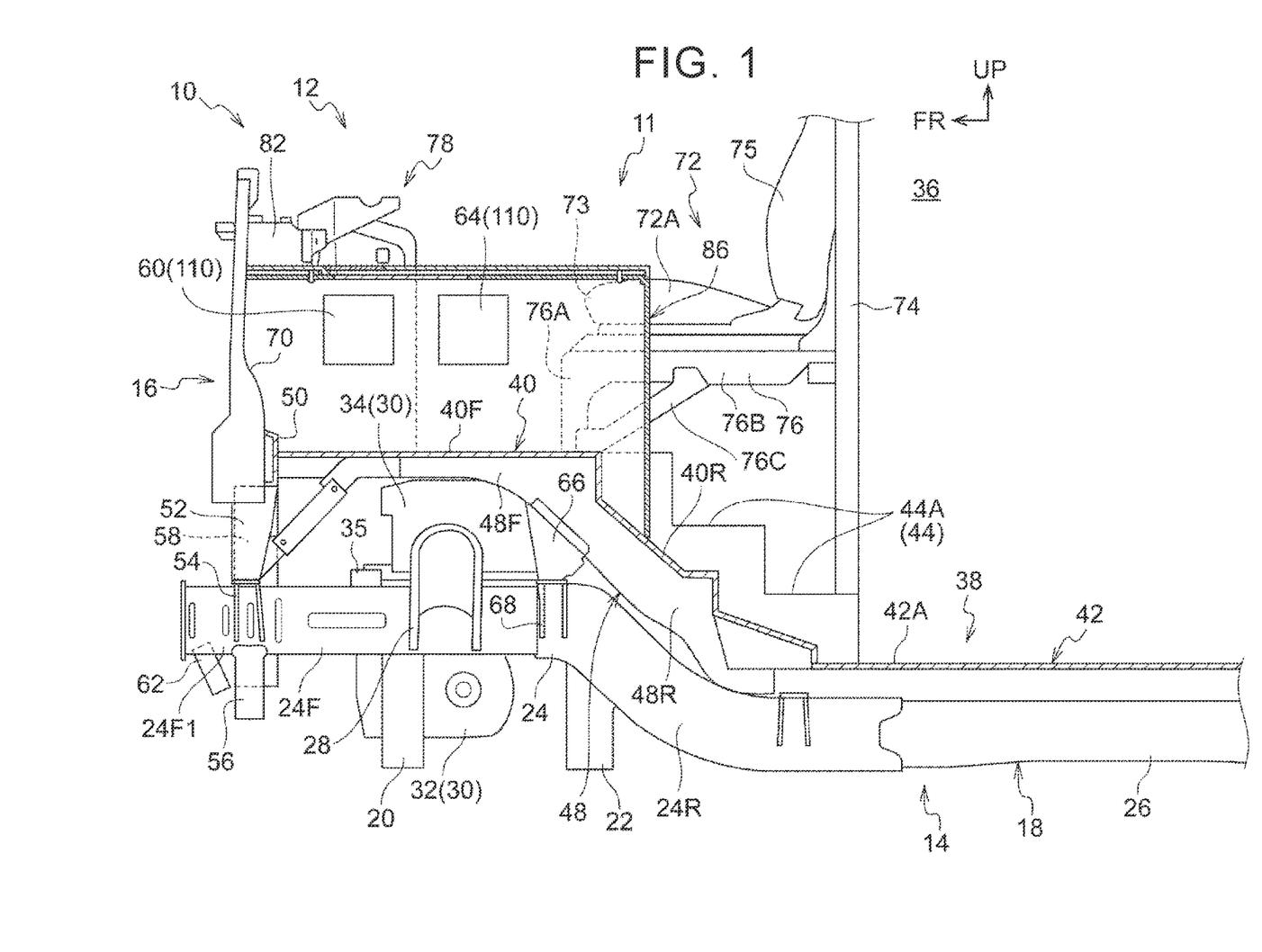
FIG. 1 is a side sectional view showing a front part of a vehicle to which a vehicle front part structure according to the present embodiment is applied.
Figure 2:
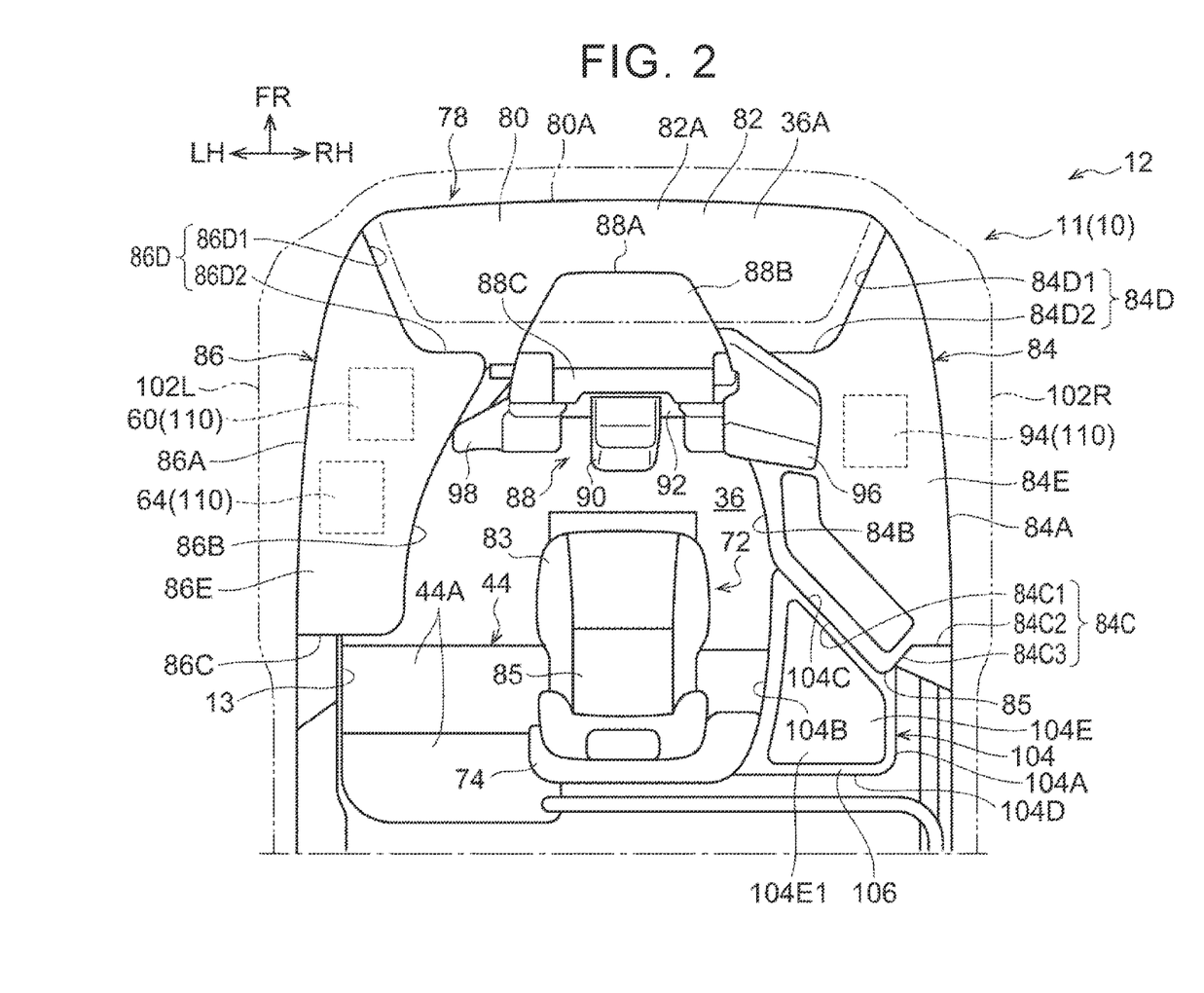
FIG. 2 is a side sectional view showing the front part of the vehicle to which the vehicle front part structure according to the present embodiment is applied.
Figure 3:
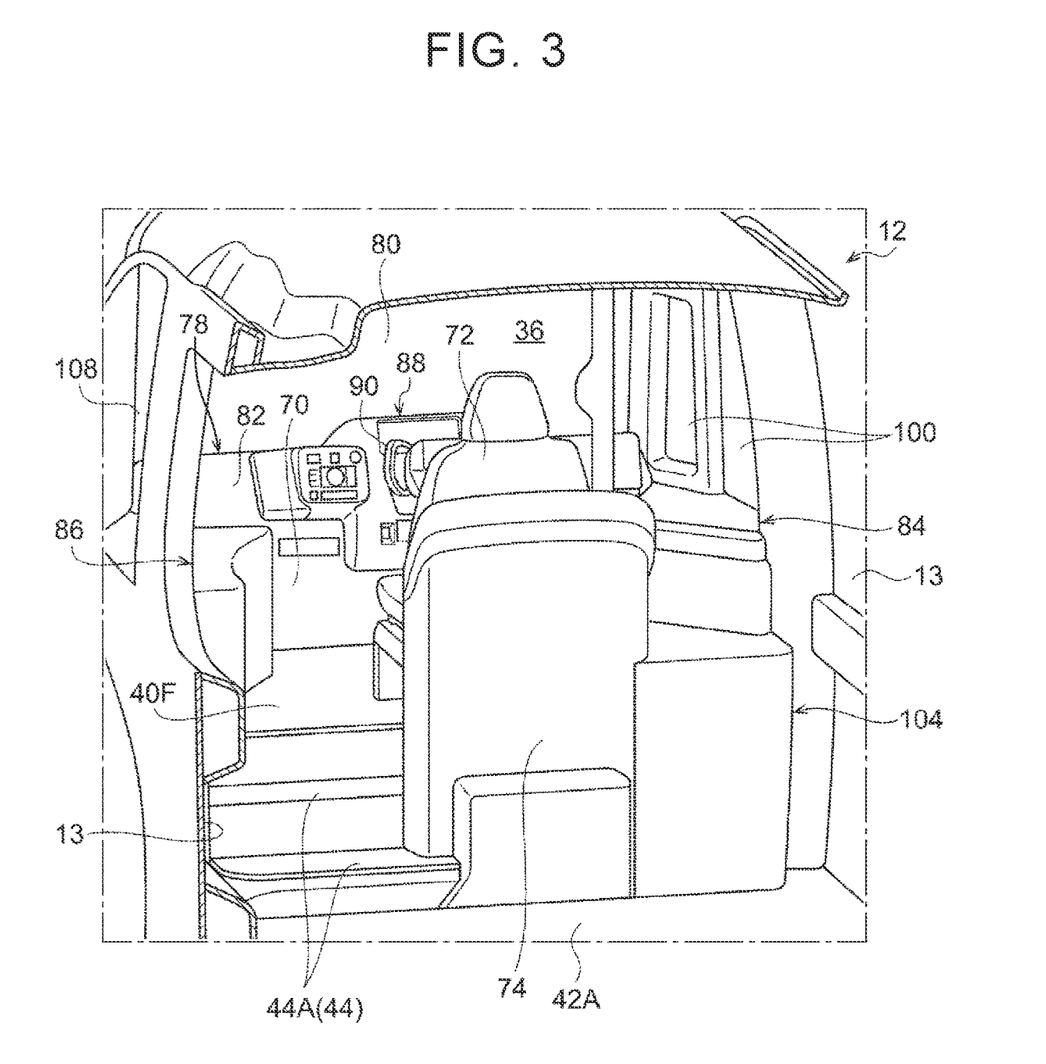
FIG. 3 is a perspective view of the front part of the vehicle to which the vehicle front part structure according to the present embodiment is applied, as viewed from a diagonally left rear side.

As shown in FIGS. 1 to 3, a vehicle 12 to which the vehicle front part structure 10 according to the present embodiment is applied is a vehicle having a frame structure in which a body 16 having a cabin is fixed on the upper side of a ladder frame 14, and is a vehicle for ride sharing such as a bus, for example. Although not shown, the body 16 of the vehicle 12 has a substantially rectangular parallelepiped outer shape. The vehicle 12 is, for example, a battery electric vehicle. First, the outline of the framework structure of the vehicle 12 will be described.

The ladder frame 14 includes a pair of right and left side frames 18 and a plurality of cross members 20 and 22. The right and left side frames 18 extend in the front-rear direction on both sides of the vehicle 12 in the vehicle width direction. The cross members 20 and 22 are arranged at intervals in the front-rear direction and extend in the vehicle width direction. Further, the right and left side frames 18 are connected in the vehicle width direction by the cross members 20 and 22.

The right and left side frames 18 are composed of right and left front side frames 24, right and left center side frames 26, and right and left rear side frames (not shown). The right and left front side frames 24 extend in the front-rear direction on both sides of the front part of the vehicle 12 in the vehicle width direction. The right and left center side frames 26 extend in the front-rear direction at both sides of the front-rear direction center part of the vehicle 12 in the vehicle width direction. The right and left rear side frames extend in the front-rear direction on both sides of the rear part of the vehicle 12 in the vehicle width direction.

Further, the front side frames 24, the center side frames 26, and the rear side frames are formed of a steel material into a square cylinder shape and have a rectangular closed section when viewed in the front-rear direction, for example. A plurality of cross members (not shown) is each provided between the right and left center side frames 26 and between the right and left rear side frames.

The front parts 24F of the right and left front side frames 24 extend linearly in the front-rear direction, and the middle portions of each front part 24F in the front-rear direction are connected in the vehicle width direction by the cross members 22. Further, suspension towers 28 are fixed to the outer surfaces of each front part 24F in the vehicle width direction.

Further, a motor 32 for making the vehicle 12 travel is disposed between the right and left front side frames 24. The motor 32 is supported by the right and left front side frames 24 via the cross members 20, 22 and the support members (not shown). Above the motor 32, an electronic unit 34 that controls the electric power supplied to the motor 32 is disposed. The electronic unit 34 is supported by the right and left front side frames 24 via a support frame 35, and the motor 32 and the electronic unit 34 constitute a power unit 30.

The body 16 supported from the lower side by the ladder frame 14 having the above configuration has a floor panel 38 configuring the floor part of the inside of the vehicle cabin 36. The floor panel 38 includes a front floor panel 40 that constitutes the floor part of the front part of the inside of the vehicle cabin 36, a central floor panel 42 that constitutes the floor part in the front-rear direction intermediate part of the inside of the vehicle cabin 36, and a rear floor panel (not shown) that constitutes the floor part of the rear part of the inside of the vehicle cabin 36. The front floor panel 40, the central floor panel 42, and the rear floor panel are made of, for example, steel plates.

The front part of the front floor panel 40 is a driver's seat floor part 40F extending in the front-rear direction and the vehicle width direction. The rear part of the front floor panel 40 is an inclined part 40R inclined downward toward the vehicle rear side.

The driver's seat floor part 40F is disposed so as to be separated upward from the front parts 24F of the right and left front side frames 24, and the inclined part 40R is located on the upper side with respect to rear parts 24R of the right and left front side frames 24. The electronic unit 34 described above is disposed below the driver's seat floor part 40F.

The front end part of the central floor panel 42 is connected to the rear end part of the inclined part 40R. The central floor panel 42 extends in the front-rear direction and the vehicle width direction. Below the central floor panel 42, a battery (not shown) for storing electric power to be supplied to the above-mentioned motor 32 is disposed.

A step is provided between the driver's seat floor part 40F and a general floor part (other floor part) 42A formed by the central floor panel 42, and the driver's seat floor part 40F is located on the upper side of the general floor part 42A. Therefore, a passage part 44 composed of a plurality of steps 44A is provided between the driver's seat floor part 40F and the general floor part 42A. An occupant can come and go between the driver's seat floor part 40F and the general floor part 42A via the passage part 44.

The front floor panel 40 is supported by the right and left front side frames 24 via a pair of right and left front side members 48. The right and left front side members 48 extend in the front-rear direction on the upper side of the right and left front side frames 24 and on the outside in the vehicle width direction. The right and left front side members 48 are manufactured by, for example, press-molding a steel plate, are joined to the lower surface of the front floor panel 40 by a method such as welding, and are formed so as to configure a closed section extending in the vehicle front-rear direction from the front floor panel 40.

The front parts 48F of the right and left front side members 48 extend linearly in the front-rear direction, and are joined to the lower surface of the driver's seat floor part 40F of the front floor panel 40. Rear parts 48R of the right and left front side members 48 are so-called kick parts that are inclined downward toward the vehicle rear side, and are joined to the lower surface of the inclined part 40R of the front floor panel 40. In the following description, the rear parts 48R of the front side members 48 will be referred to as "kick parts 48R".

Further, a radiator support upper member 50 extending in the vehicle width direction is disposed at the front end parts of the right and left front side members 48. The radiator support upper member 50 is made of, for example, a steel plate, and has a hat-shaped section that opens forward when viewed in the vehicle width direction. The front end parts of the right and left front side members 48 are provided with a flange part that is overlapped with the rear surface of the radiator support upper member 50, for example, and the flange part is fixed to the rear surface of the radiator support upper member 50 by bolting. As a result, the front end parts of the right and left front side members 48 are connected in the vehicle width direction by the radiator support upper member 50.

Both ends of the radiator support upper member 50 in the vehicle width direction are supported by front end parts 24F1 of the right and left front side frames 24 via right and left front pillar members 52. The right and left front pillar members 52 are formed by, for example, press-molding a steel plate, and have a box shape with the front side and the upper side open. In each front pillar member 52, for example, a flange part (not shown) formed at the upper end part is fixed to the radiator support upper member 50 by welding or bolting. The lower end part of each front pillar member 52 is fixed to the front side frame 24 via a bracket 54 by welding or the like. Each front pillar member 52 is placed on the upper surface of each bracket 54 and is fixed to each bracket 54 by as bolting.

A radiator support lower member 56 extending in the vehicle width direction is disposed on the front end parts 24F1 of the front side frames 24, below the radiator support upper member 50. The radiator support lower member 56 is made of, for example, a steel plate. A radiator 58 is for cooling the power unit 30, and is fixed to the radiator support lower member 56, the radiator support upper member 50, and the right and left front pillar members 52 so as to be supported by the radiator support lower member 56, the radiator support upper member 50, and the right and left front pillar members 52.

Further, although not shown, the vehicle 12 in the present embodiment can be equipped with an autonomous driving unit (hereinafter referred to as an "AKD") for controlling autonomous driving. A radiator 62 is separately provided as a part of the AKD. The radiator 62 is used for cooling the AKD. For example, the radiator 62 is supported by the radiator support lower member 56 and the right and left front pillar members 52 by being fixed to the radiator support lower member 56 and the right and left front pillar members 52.

The front end portion of each kick part 48R of the right and left front side members 48 is supported by the right and left front side frames 24 via the right and left rear pillar members 66. The right and left rear pillar members 66 are formed by, for example, press-molding a steel plate, and have a box shape in which the central side and the upper side in the vehicle width direction are open.

In each rear pillar member 66, for example, a flange part formed on the upper end part is fixed to the front end part of each kick part 48R by welding. The lower end part of each rear pillar member 66 is fixed to the front side frame 24 via a bracket 68 by welding or the like. Each rear pillar member 66 is placed on the upper surface of each bracket 68, and is fixed to each bracket 68 by bolting.

The right and left front side members 48 are supported from below by the right and left front side frames 24 via the radiator support upper member 50, the front pillar member 52, the brackets 54, the rear pillar member 66, and the brackets 68. The front floor panel 40 is supported from below by the right and left front side members 48.

Further, a dash panel 70 is provided at the front end part of the front floor panel 40, and an instrument panel 78 is provided at the upper end part of the dash panel 70 on the front side of the driver's seat 72. On the rear side of the driver's seat 72, a defining wall 74 for defining the front floor panel 40 and the central floor panel 42 is provided along the vehicle width direction except for the passage part 44.

The driver's seat 72 is supported by a frame 76 having a substantially L-shape when viewed from the side. The frame 76 includes a leg part 76A disposed along a substantially up-down direction and a pedestal 76B disposed along a substantially horizontal direction. The lower end of the leg part 76A is connected to the front floor panel 40, and the rear end of the pedestal 76B is connected to the defining wall 74. A seat cushion 72A configuring the seat part of the driver's seat 72 is fixed to the pedestal 76B, and a brace 76C is connected to the center of the pedestal 76B in the front-rear direction and the lower part of the leg part 76A.

The general floor part 42A is provided on the rear side of the defining wall 74, and a plurality of passenger seats (not shown) is disposed on the general floor part 42A. The passenger seats may be set to be fixed to the side of the vehicle.

As shown in FIG. 2, in the present embodiment, the instrument panel 78 includes a lower end part 80A (a front end part 36A of the inside of the vehicle cabin 36) of a wind shield 80 of the inside of the vehicle cabin 36, and is formed in a substantially U-shape in which the rear side is an opening in a plan view.

The instrument panel 78 is configured to include an instrument panel main body part 82 provided at the front end part 36A inside the vehicle cabin 36, an instrument panel side part 84 provided on the right side of the instrument panel main body part 82, and an instrument panel side part 86 provided on the left side of the instrument panel main body part 82.

The instrument panel 78 is continuously formed so that the instrument panel side part 84, the instrument panel main body part 82, and the instrument panel side part 86 are connected to each other, and these members are integrally provided. In the instrument panel 78, it is sufficient that the instrument panel side part 84, the instrument panel main body part 82, and the instrument panel side part 86 are recognized as being integrated. The instrument panel side part 84, the instrument panel main body part 82, and the instrument panel side part 86 do not necessarily have to be integrally provided by integral molding or the like.

Instrument Panel Main Body Part 82

The instrument panel main body part 82 is provided with an operation part 88 at the center thereof. The operation part 88 is provided on the front side of the driver's seat 72. The operation part 88 has a substantially trapezoidal shape in a plan view, and a front end 88A of the operation part 88 is formed along the vehicle width direction and constitutes a part of an upper surface 82A of the instrument panel main body part 82.

The operation part 88 includes an upper wall part 88B formed in an arc shape toward the upward side as the upper wall part 88B extends toward the rear side from the front end 88A. At the rear end of the upper wall part 88B, a rear wall part 88C configuring the rear side of the operation part 88 is provided, and the rear wall part 88C is formed along the vehicle width direction and the upper end of the rear wall part 88C is located above the front end 88A. Further, the rear wall part 88C is formed in an arc shape toward the front side toward the upper side, and a steering wheel 90 is disposed at the center of the rear wall part 88C of the operation part 88 in the vehicle width direction.

Further, in the rear wall part 88C of the operation part 88, an instrument disposing part 92 in which instruments (not shown) are disposed is provided near the central part in the vehicle width direction. An instrument disposing part 92 is disposed slightly offset to one side in the vehicle width direction (here, the left side of the vehicle) with respect to the center of the operation part 88 in the vehicle width direction. Further, the instrument disposing part 92 is disposed in vehicle front part of the steering wheel 90 described above.

A register 96 is provided on the right side of the operation part 88. The register 96 is connected to an air conditioning unit (vehicle air conditioning device) 94 arranged in an instrument panel side part 84, which will be described later, and blows air conditioning air generated by the air conditioning unit 94 toward the inside of the vehicle cabin 36 side. A register 98 is provided on the left side of the operation part 88. The register 98 is connected to the air conditioning unit 94 in the same manner as the register 96, and blows the air conditioning air generated by the air conditioning unit 94 toward the inside of the vehicle cabin 36.

Instrument Panel Side Part 84

The instrument panel side part 84 is provided on the right side of the instrument panel main body part 82 and on the lower side of a front side glass 100 (see FIG. 3), and has a box shape. The instrument panel side part 84 has a long substantially rectangular parallelepiped shape along the vehicle front-rear direction in a plan view, and is configured to include an outer wall part 84A configuring the outer side in the vehicle width direction, an inner wall part 84B configuring the inner side in the vehicle width direction, and a rear wall part 84C configuring the rear side in the front-rear direction.

The outer wall part 84A of the instrument panel side part 84 is formed along a fender panel 102R provided on the front part and the side part of the vehicle 12. The outer wall part 84A may be configured by the fender panel 102R.

The inner wall part 84B of the instrument panel side part 84 is formed in an arc shape so as to extend toward the inside in the vehicle width direction as it extends toward the instrument panel main body part 82 (a front end 84D of the instrument panel side part 84) in a plan view, and the curvature is set to be larger than that of the outer wall part 84A.

The rear wall part 84C of the instrument panel side part 84 is configured to include an inclined part 84C1 that is connected to the inner wall part 84B and that is inclined toward the outside in the vehicle width direction as it extends toward the rear side, and a lateral wall part 84C2 that is connected to the outer wall part 84A and that is formed along the vehicle width direction on the outer side of the inclined part 84C1 in the vehicle width direction. That is, the width dimension of the instrument panel side part 84 becomes smaller as it extends from the front end 84D of the instrument panel side part 84 toward the rear wall part 84C that configures the rear end of the instrument panel side part 84. Further, the lateral wall part 84C2 is located on the front side of the rear end 85 of the inclined part 84C1. An inclined part 84C3 is formed between the inclined part 84C1 and the lateral wall part 84C2, in which the inclined part 84C3 is the inclined part 84C1 inverted about an axis along the vehicle front-rear direction with the rear end 85 of the inclined part 84C1 being the starting point.

On the other hand, the front end 84D of the instrument panel side part 84 is formed integrally with the instrument panel main body part 82 and the dash panel 70 so as to match the shape of the matches the shape of the instrument panel main body part 82 and the dash panel 70 while avoiding interference with the instrument panel main body part 82 and the dash panel 70 (see FIG. 1). Therefore, the instrument panel side part 84 does not necessarily need a wall part. The front end 84D of the instrument panel side part 84 is configured to include an inclined part 84D1 that is inclined toward the vehicle rear direction as it extends from the outer side toward the inner side in the vehicle width direction in a plan view, and a lateral wall part 84D2 that is formed continuously with the inclined part 84D1 and that is formed along the vehicle width direction.

Further, the instrument panel side part 84 is provided with a plate-shaped upper wall part 84E at the upper ends of the front end 84D, the outer wall part 84A, the inner wall part 84B, and the rear wall part 84C. The upper wall part 84E is fixed to the upper ends of the front end 84D, the outer wall part 84A, the inner wall part 84B, and the rear wall part 84C by welding, bolts, or the like, and the instrument panel side part 84 is closed by the upper wall part 84E. An air conditioning unit (vehicle-mounted component) 94 is housed in the instrument panel side part 84.

Seat Side Part 104

A seat side part 104 is provided on the rear side of the instrument panel side part 84, and is disposed on the right side of the driver's seat 72. The seat side part 104 has a box shape, and is configured to include an outer wall part 104A configuring the outer side in the vehicle width direction, an inner wall part 104B configuring the inner side in the vehicle width direction, and a front end 104C configuring the front side in the vehicle front-rear direction, and a rear wall part 104D configuring the rear side in the vehicle front-rear direction.

The outer wall part 104A of the seat side part 104 is formed along the vehicle front-rear direction. The inner wall part 104B of the seat side part 104 is formed along the shape of the inner wall part 84B of the instrument panel side part 84 in a plan view, and is formed in an arc shape so as to extend inward in the vehicle width direction as it extends toward the rear side.

The front end 104C of the seat side part 104 is formed so as to have the same angle as the inclined part 84C1 configuring the inside of the rear wall part 84C of the instrument panel side part 84 in the vehicle width direction. The front end 104C of the seat side part 104 does not necessarily need a wall portion.

The rear wall part 104D of the seat side part 104 is formed along the vehicle width direction, is provided on the rear side of the driver's seat 72, and is integrated with the defining wall 74 that defines the front floor panel 40 and the central floor panel 42.

The seat side part 104 is provided with a plate-shaped upper wall part 104E at the upper ends of the front end 104C, the outer wall part 104A, the inner wall part 104B, and the rear wall part 104D. The upper wall part 104E is fixed to the upper ends of the front end 104C, the outer wall part 104A, the inner wall part 104B, and the rear wall part 104D by welding, bolts, or the like, and the seat side part 104 is closed by the upper wall part 104E.

The outer edge of the upper wall part 104E is provided with a protruding part 106 protruding from an upper surface 104E1 of the upper wall part 104E and the protruding part 106 restricts the movement of the article placed on the upper surface 104E1 of the upper wall part 104E and suppresses the article from easily slipping off. The upper wall part 104E of the seat side part 104 is provided at a position lower than the upper wall part 84E of the instrument panel side part 84, and is set at a high at which the occupant seated in the driver's seat 72 can easily use the upper wall part 104E of the seat side part 104 as a mounting table.

Instrument Panel Side Part 86

The instrument panel side part 86 is provided on the left side of the instrument panel main body part 82 and on the lower side of the front side glass 108 (see FIG. 3), and has a box shape. The instrument panel side part 86 has a substantially rectangular parallelepiped shape that is long along the vehicle front-rear direction in a plan view, and is configured to include the outer wall part 86A configuring the outer side in the vehicle width direction, the inner wall part 86B configuring the inner side in the vehicle width direction, and the rear wall part 86C configuring the rear side in the vehicle front-rear direction, similar to the instrument panel side part 84.

The outer wall part 86A of the instrument panel side part 86 is formed along a fender panel 102L provided on the front part and the side part of the vehicle 12. The outer wall part 86A may be configured by the fender panel 102L.

The inner wall part 86B of the instrument panel side part 86 is formed in an arc shape so as to extend toward the inside in the vehicle width direction as it extends toward the instrument panel main body part 82 (a front end 86D of the instrument panel side part 86) in a plan view, and the curvature is set to be larger than that of the outer wall part 86A. That is, the width dimension of the instrument panel side part 86 becomes smaller as it extends from the front end 86D of the instrument panel side part 86 toward the rear wall part 86C that configures the rear end of the instrument panel side part 86.

The rear wall part 86C of the instrument panel side part 86 is formed along the vehicle width direction on the front side of the passage part 44.

On the other hand, the front end 86D of the instrument panel side part 86 is formed integrally with the instrument panel main body part 82 and the dash panel 70 so as to match the shape of the matches the shape of the instrument panel main body part 82 and the dash panel 70 while avoiding interference with the instrument panel main body part 82 and the dash panel 70 (see FIG. 1). Therefore, the instrument panel side part 86 does not necessarily need a wall part. The front end 86D of the instrument panel side part 86 is configured to include an inclined part 86D1 that is inclined toward the vehicle rear direction as it extends from the outer side toward the inner side in the vehicle width direction in a plan view, and a lateral wall part 86D2 that is formed continuously with the inclined part 86D1 and that is formed along the vehicle width direction.

Further, the instrument panel side part 86 is provided with a plate-shaped upper wall part 86E at the upper ends of the front end 86D, the outer wall part 86A, the inner wall part 86B, and the rear wall part 86C. The upper wall part 86E is fixed to the upper ends of the front end 86D, the outer wall part 86A, the inner wall part 86B, and the rear wall part 86C by welding, bolts, or the like, and the instrument panel side part 86 is closed by the upper wall part 86E.

A reserve tank (vehicle-mounted component) 60 for storing the coolant of the radiator 58 and a relay box (vehicle-mounted component) 64 for storing electronic components are arranged in the instrument panel side part 86. The reserve tank 60 is disposed on the front side in the vehicle front-rear direction with respect to the relay box 64. Further, the upper wall part 86E of the instrument panel side part 86 can be opened and closed, and by opening the upper wall part 86E, the coolant can be supplied from the inside of the vehicle cabin 36 to the reserve tank 60 housed in the instrument panel side part 86.

Operations and Effects of Vehicle Front Part Structure

Next, operation and effects of the vehicle front part structure 10 according to the present embodiment will be described.

As shown in FIGS. 2 and 3, in the vehicle front part structure 10 of the present embodiment, the power unit 30 is mounted on a vehicle front part 11 and the driver's seat 72 is disposed on the vehicle upper side with respect to the power unit 30 and on the center side in the vehicle width direction. The instrument panel 78 includes the instrument panel main body part 82 provided in vehicle front side of the driver's seat 72, and the right and left instrument panel side parts 84, 86 provided on the right and left sides of the instrument panel main body part 82.

The instrument panel side parts 84, 86 are provided integrally with the instrument panel main body part 82 and are disposed on both sides in the vehicle width direction with respect to the driver's seat 72, and the air conditioning unit 94 is housed in the instrument panel side part 84. The reserve tank 60 and the relay box 64 are housed in the instrument panel side part 86. The air conditioning unit 94, the reserve tank 60, the relay box 64, and the like are so-called vehicle-mounted components 110.

In the present embodiment, as described above, the right and left instrument panel side parts 84 and 86 are provided integrally with the instrument panel main body part 82. Thus, inside the vehicle cabin 36, the instrument panels 78 are provided from the front side of the vehicle with respect to the driver's seat 72 to both sides in the vehicle width direction.

As shown in FIG. 2, when the engine compartment is not provided on the vehicle front side of the inside of the vehicle cabin 36, although not shown, the disposing location of the vehicle-mounted components 110 is restricted, compared to a vehicle in which the engine compartment is provided on the vehicle front side of the inside of the vehicle cabin 36. In the present embodiment, since the air conditioning unit 94 is housed in the instrument panel side part 84, and the reserve tank 60 and the relay box 64 are housed in the instrument panel side part 86, it is possible to secure a housing space for the vehicle-mounted components 110.

Further, in the present embodiment, since the instrument panel side parts 84 and 86 are provided integrally with the instrument panel main body part 82, dead space is reduced as compared with a comparative example in which the instrument panel side parts 84 and 86 are provided so as to be separated from the instrument panel main body part 82, although not shown. Therefore, in the present embodiment, the space around the driver's seat 72 can be expanded by the reduced amount of dead space, and the comfortability of the driver can be ensured.

Further, by providing the instrument panel side parts 84 and 86 integrally with the instrument panel main body part 82, the outer shape lines of the instrument panel side parts 84 and 86 and the instrument panel main body part 82 can be continuously formed. Therefore, the design around the driver's seat 72 can be improved, compared to a comparative example (not shown) in which the instrument panel side parts 84 and 86 are provided in a state of being separated from the instrument panel main body part 82.

Further, in the present embodiment, the relay box 64 is arranged with the reserve tank 60 along the vehicle front-rear direction. Thereby, for example, the relay box 64 can be inspected at the same time when the coolant of the reserve tank 60 is supplied, and the workability is good.

Further, in the present embodiment, the relay box 64 is arranged with the reserve tank 60 along the vehicle front-rear direction. Thus, it possible to shorten the dimensions of the instrument panel side part 86 in the vehicle width direction, as compared to a comparative example (not shown) in which the relay box 64 is arranged with the reserve tank 60 along the vehicle width direction. As a result, it is possible to reduce the stressed feeling that is felt by the driver and that is caused by the instrument panel side part 86.

On one hand, in the present embodiment, for example, the instrument panel side part 86 and the front part 73 of the driver's seat 72 are arranged so as to overlap in the vehicle width direction. Generally, in order to ensure the wide general floor part 42A, it is necessary to set the driver's seat floor part 40F as compact as possible. For example, as a comparative example (not shown), when the instrument panel side part 86 is arranged so as to completely overlap with the driver's seat 72 when viewed in the vehicle width direction, the instrument panel side part 86 will be provided next to the driver's seat 72 over the entire vehicle front-rear direction of the driver's seat 72. In this case, the driver feels stressed due to the instrument panel side part 86 being provided on the side in the vehicle width direction over the entire vehicle front-rear direction, and the space around the driver's seat 72 is feels tight.

On the other hand, in the present embodiment, the instrument panel side part 86 and the front part 73 of the driver's seat 72 are arranged so as to overlap in the vehicle width direction. In other words, a rear part 75 side of the driver's seat 72 does not overlap with the instrument panel side part 86 when viewed in the vehicle width direction. On the rear part 75 side of the driver's seat 72, a space is formed between the driver's seat 72 and the vehicle side part 13, and the space around the driver's seat 72 is expanded by that amount. Therefore, it is possible to reduce the stressed feeling that is felt by the driver and that is caused by the instrument panel side part 86 being provided on the side in the vehicle width direction.

In the present embodiment, the inner wall part 84B of the instrument panel side part 84 is formed in an arc shape so as to extend toward the inside in the vehicle width direction as it extends toward the instrument panel main body part 82 (the front end 84D of the instrument panel side part 84) in a plan view, and the curvature is set to be larger than that of the outer wall part 84A. Thus, in the present embodiment, the front end 84D of the instrument panel side part 84 has a larger dimension in the vehicle width direction than the rear wall part 84C of the instrument panel side part 84.

As a comparative example (not shown), when the inner wall part 84B of the instrument panel side part 84 is formed in a linear shape along the vehicle front-rear direction from the front end 84D of the instrument panel side part 84 toward the rear wall part 84C of the instrument panel side part 84, the dimensions of the front end 84D and the rear wall part 84C of the instrument panel side part 84 in the vehicle width direction are the same.

Therefore, when the dimensions of the rear wall part 84C of the instrument panel side part 84 in the vehicle width direction are the same in the comparative example and the present embodiment, the dimension of the front end 84D of the instrument panel side part 84 in the vehicle width direction is larger in the present embodiment. Thus, the housing space in the instrument panel side part 84 can be made larger than that of the comparative example.

Further, when the dimensions of the front end 84D of the instrument panel side part 84 in the vehicle width direction are the same in the comparative example and the present embodiment, the dimension of the rear wall part 84C of the instrument panel side part 84 in the vehicle width direction is shorter in the present embodiment. As a result, the separation distance between the instrument panel side part 84 and the driver's seat 72 can be increased.

Thus, in the present embodiment, the space around the driver's seat 72 can be widened toward the rear part side of the instrument panel side part 84, and an open feeling can be obtained for the occupant by that amount. It should be noted that the same effect as that of the instrument panel side part 84 can be obtained on the instrument panel side part 86 side. That is, by adopting the same configuration in the instrument panel side part 84 and the instrument panel side part 86, a more open feeling can be obtained for the occupant.

Further, in the present embodiment, as shown in FIG. 1 and FIG. 3, the driver's seat floor part 40F is disposed at a position higher than the general floor part 42A, and the passage part 44 is located between the driver's seat floor part 40F and the general floor part 42A. As a result, the general floor part 42A can be set lower than the driver's seat floor part 40F, and the occupant can easily get on and off the general floor part 42A.

Further, in the present embodiment, due to the passage part 44 connecting the driver's seat floor part 40F and the general floor part 42A in the inside of the vehicle cabin 36 being formed between the instrument panel side part 86 and the driver's seat 72, the occupant can come and go between the driver's seat floor part 40F and the general floor part 42A via the passage part 44.

In the present embodiment, the air conditioning unit 94 is housed in the instrument panel side part 84, and the reserve tank 60 and the relay box 64 are housed in the instrument panel side part 86. However, the configuration is not limited to this. In addition to these members, an AKD, an electronic control unit (ECU) that controls the traveling of the vehicle, and the like may be housed.

In addition, the present disclosure can be implemented with various modifications without departing from the scope of the disclosure. Further, it goes without saying that the scope of rights of the present disclosure is not limited to the above-described embodiment.

What is claimed is:

1. A vehicle front part structure comprising:
    a power unit mounted on a vehicle front part, the power unit is off-center with respect to a vehicle width direction;
    a driver's seat disposed on a vehicle upper side and on a center side in the vehicle width direction with respect to the power unit; and
    an instrument panel configured to include an instrument panel main body part that is disposed on a vehicle front side with respect to the driver's seat, and right and left instrument panel side parts that are provided integrally with the instrument panel main body part, that are disposed on both sides of the driver's seat in the vehicle width direction, and that house vehicle-mounted components inside,
    wherein a reserve tank that stores coolant of a radiator, among the vehicle-mounted components, is housed in one of the instrument panel side parts, and
    wherein in the one of the instrument panel side parts, a relay box that houses an electronic component, among the vehicle-mounted components, is arranged with the reserve tank in a vehicle front-rear direction.

2. The vehicle front part structure according to claim 1, wherein a vehicle air conditioning device among the vehicle-mounted components is housed in another one of the instrument panel side parts.

3. The vehicle front part structure according to claim 1, wherein at least one of the instrument panel side parts and a front part of the driver's seat are arranged so as to overlap when viewed in the vehicle width direction.

4. The vehicle front part structure according to claim 1,
    wherein the instrument panel side parts are configured to include an inner wall part that configures an inner side in the vehicle width direction and a rear wall part that configures a rear side in the vehicle front-rear direction, and
    wherein the inner wall part has an arc shape so as to extend outward in the vehicle width direction as the inner wall part extends from the instrument panel main body part toward the rear wall part in a plan view.

5. The vehicle front part structure according to claim 1, wherein a driver's seat floor part on which the driver's seat is arranged is disposed at a position higher than another floor part inside a vehicle cabin, and a step is provided between the driver's seat floor part and the other floor part.

6. The vehicle front part structure according to claim 1, wherein between one of the instrument panel side parts and the driver's seat, a passage part that connects a driver's seat floor part on which the driver's seat is arranged and another floor part inside a vehicle cabin is provided.

7. The vehicle front part structure according to claim 6, wherein the another floor part is disposed between the driver's seat floor part and the instrument panel, wherein the another floor part is lower than the driver's seat floor part.

8. The vehicle front part structure according to claim 3, wherein the at least one of the instrument panel side parts and a rear part side of the driver's seat are arranged in the vehicle front-rear direction.

9. The vehicle front part structure according to claim 1, wherein:
    the right and left instrument panel side parts comprise a front end and a rear wall part; and
    the front end of the right and left instrument panel side parts is longer than the rear wall part of the right and left instrument panel side parts in the vehicle width direction.

* * * * *